No. 829,501. PATENTED AUG. 28, 1906.
O. BRÜNLER.
APPARATUS FOR ADVERTISEMENT AND HEATING PURPOSES.
APPLICATION FILED JAN. 25, 1906.
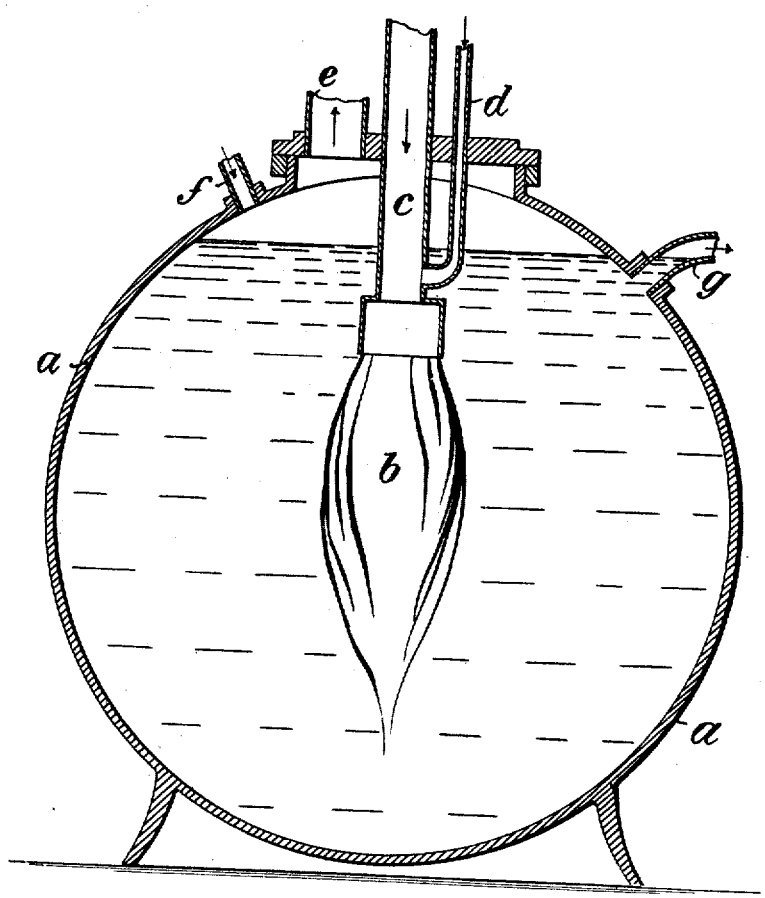
Witnesses:
Wilhelm Brase.
Willi Casper
Inventor
Oscar Brünler
per Gerson, Sachs
Attorneys

UNITED STATES PATENT OFFICE.

OSCAR BRÜNLER, OF LEIPSIC-GOHLIS, GERMANY.

APPARATUS FOR ADVERTISEMENT AND HEATING PURPOSES.

No. 829,501.   Specification of Letters Patent.   Patented Aug. 28, 1906.

Application filed January 25, 1906. Serial No. 297,785.

*To all whom it may concern:*

Be it known that I, OSCAR BRÜNLER, engineer, of Leipsic-Gohlis, in the Kingdom of Saxony, Germany, have invented a new and useful Apparatus for Advertisement and Heating Purposes, of which the following is a specification.

This invention relates to an apparatus which serves as an object of effective decoration for shop-fronts or the like and for advertisement purposes, and at the same time it produces heated gases and hot water for heating purposes.

The invention is illustrated by the accompanying drawing, in which the apparatus is shown in vertical cross-section.

The apparatus consists of a vessel $a$ of transparent material—for instance, glass. The same is nearly filled with water or another suitable transparent liquid. Below the surface of the water burns a flame $b$, produced by liquid combustibles, such as oil and compressed air. The air is led in through the pipe $c$ and the combustibles by pipe $d$. In place of air also compressed oxygen can be used. The gases arising from the combustion escape through a pipe $e$ in the top of the vessel. By a pipe $f$, also arranged near the top of the vessel, the liquid is led in. An overflow-pipe $g$ for the heated liquid is further arranged near the top.

When the apparatus is placed in a shop-front or the like, the flame burning within the liquid visible through the same will form a point of attraction which provokes the attention of the public. When the names of commercial objects are arranged on the walls of the vessel, these will naturally find much consideration.

For the object of using the apparatus for heating purposes the liquid is conducted through the pipe $f$ into the vessel only in such quantity that the same flows off through $g$ heated. This pipe then is in connection with heating-pipes or another suitable heating apparatus. The waste gases escaping through pipe $e$ may also be utilized in like manner.

What I claim as my invention is—

1. In an apparatus for advertisement and heating purposes, the combination of a transparent vessel, a transparent liquid therein, and a flame burning within the latter, as and for the purpose specified.

2. In an apparatus for advertisement and heating purposes, the combination of a transparent vessel, a transparent liquid therein, a flame burning within the liquid, and heating apparatus in connection with the vessel, as and for the purpose specified.

3. In an apparatus for advertisement and heating purposes, the combination of a transparent vessel, a burner for a mixture of liquid combustibles and air or oxygen within the same, and a transparent liquid filling nearly the vessel and surrounding the burner, as and for the purpose specified.

4. In an apparatus for advertisement and heating purposes, the combination of a transparent vessel, a burner for a mixture of liquid combustibles and air or oxygen within the same, a transparent liquid filling nearly the vessel and surrounding the burner, an overflow for the liquid, a pipe leading the liquid into the vessel, and a pipe for the escape of the waste gases, as and for the purpose specified.

OSCAR BRÜNLER.

Witnesses:
 FERDINAND REICH,
 FREDERICK HOYERMANN.